US012067824B2

(12) United States Patent
Herrero

(10) Patent No.: US 12,067,824 B2
(45) Date of Patent: Aug. 20, 2024

(54) METHOD AND SYSTEM FOR INDOOR GEOLOCATION AND ACCESS CONTROL

(71) Applicant: Johnson Controls Tyco IP Holdings LLP, Milwaukee, WI (US)

(72) Inventor: Rolando Herrero, Amherst, NH (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 17/714,640

(22) Filed: Apr. 6, 2022

(65) Prior Publication Data

US 2023/0326275 A1 Oct. 12, 2023

(51) Int. Cl.
*G07C 9/28* (2020.01)
*G08C 23/00* (2006.01)

(52) U.S. Cl.
CPC ............... *G07C 9/28* (2020.01); *G08C 23/00* (2013.01)

(58) Field of Classification Search
CPC .................................. G07C 9/28; G08C 23/00
See application file for complete search history.

(56) References Cited

U.S. PATENT DOCUMENTS

| | | | | |
|---|---|---|---|---|
| 2019/0080538 | A1* | 3/2019 | Shahidi | H04L 9/3255 |
| 2019/0237096 | A1 | 8/2019 | Trella et al. | |
| 2019/0349758 | A1* | 11/2019 | Zhu | H04W 12/65 |
| 2020/0201968 | A1* | 6/2020 | Danielsen | G06F 21/32 |
| 2021/0142600 | A1 | 5/2021 | Tiwari et al. | |
| 2021/0358250 | A1* | 11/2021 | Venetianer | G07C 9/27 |
| 2022/0319525 | A1* | 10/2022 | Mahadevan | H04B 11/00 |

FOREIGN PATENT DOCUMENTS

| | | | | |
|---|---|---|---|---|
| JP | 2021124567 A | 8/2021 | | |
| KR | 20210133252 A * | 11/2021 | | |
| WO | WO-2018081697 A1 * | 5/2018 | | G07C 9/00 |

OTHER PUBLICATIONS

International Search Report and Written Opinion in PCT/US2023/017149, mailed Jul. 5, 2023, 14 pages.

* cited by examiner

*Primary Examiner* — Curtis A Kuntz
*Assistant Examiner* — James E Munion
(74) *Attorney, Agent, or Firm* — ARENTFOX SCHIFF LLP

(57) ABSTRACT

Example implementations include a method, system, and computer-readable medium, comprising collecting environment information by a first reader device configured to control access to a first secure area via ultrasound communications. The implementations further include determining first input information based on the environment information, the first input information. Additionally, the implementations further include determining, via a machine learning model, access intention information identifying the first secure area or a second secure area as an object of interest based on the first input information and second input information, wherein the second input information is associated with a second reader device that controls access to the second secure area and is co-located with the first reader device. Additionally, the implementations further include providing, based on the access intention information, access to one of the first secure area or the second secure area.

18 Claims, 6 Drawing Sheets

METHOD AND SYSTEM FOR INDOOR GEOLOCATION AND ACCESS CONTROL

BACKGROUND

Infrastructures (e.g., buildings, plants, warehouses, laboratories) and/or assets (e.g., safe-deposit boxes, computer devices) may utilize one or more access-controlled points to prevent unauthorized people from accessing the infrastructures and/or assets. Further, an authorized user may rely on a mobile device to access an access-controlled infrastructure/asset. For example, an authorized user may possess a mobile device configured to acoustically broadcast an authentication message that may cause an unlocking of an access control device. However, in environments employing co-located access control devices, broadcasting an authentication message may cause both access control devices to unlock, which may significantly limit the security provided by the access control devices.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an aspect, a method for collecting environment information by a first reader device configured to control access to a first secure area and/or asset via first ultrasound communications; determining first input information based on the environment information, the first input information including power information, foot information, infrared (IR) information, and/or exit information; determining, via a machine learning model, access intention information identifying the first secure area and/or asset or the second secure area and/or asset as an object of interest based on the first input information and second input information, wherein the second input information is associated with a second reader device that controls access to the second secure area and/or asset and is co-located with the first reader device; and providing, based on the access intention information, access to one of the first secure area and/or asset or the second secure area and/or asset.

In another aspect, an example computer-readable medium (e.g., non-transitory computer-readable medium) storing instructions for performing the methods described herein and an example apparatus including means of performing operations of the methods described herein are also disclosed.

Additional advantages and novel features relating to implementations of the present disclosure will be set forth in part in the description that follows, and in part will become more apparent to those skilled in the art upon examination of the following or upon learning by practice thereof.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes techniques for implementing indoor geolocation and access control. In particular, aspects of the present disclosure provide an access control reader device configured to determine an access control reader device of interest among a plurality of co-located (i.e., within the same location or in close proximity to) access control reader devices in a passive access system, and provide access to an authorized user via the access control reader device of interest. Some access control systems may employ sound-based (e.g., ultrasound) access control to increase the range of the communication from inches to feet and remove the need for an access card to receive access to a secure area or asset. However, in an access control system with co-located sound-based access control reader devices each controlling access to a secure area or asset, an access request message may cause one or more secure areas or assets in proximity to the access control reader device of interest to incorrectly be made accessible, thereby frustrating critical access control goals of the access control system. Accordingly, the present techniques predict the access control reader device of interest of an authorized user and restrict provision of access to the secure area/asset controlled by the access control reader device of interest, thereby improving the security of employ sound-based access control systems.

Figure 1:
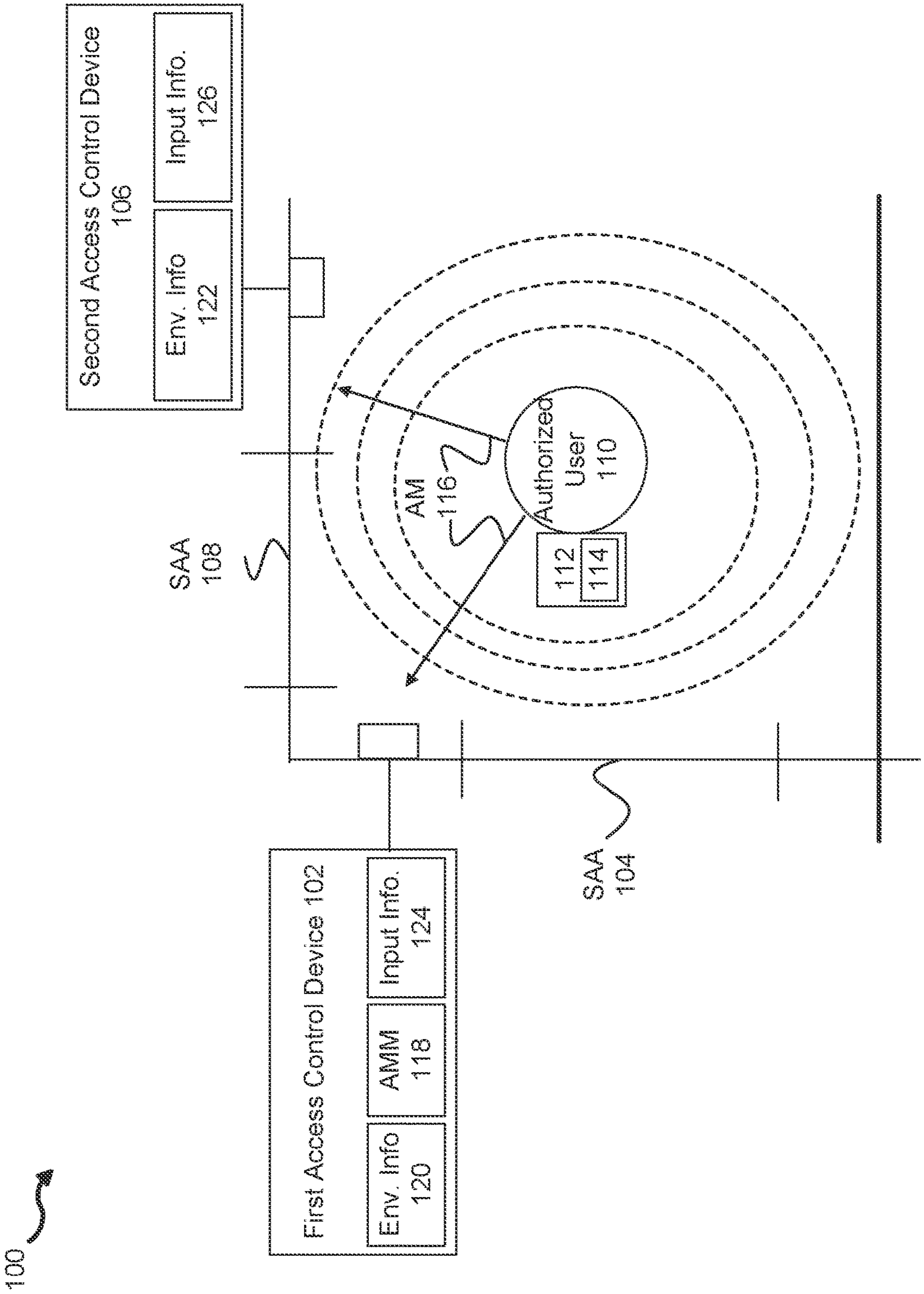
FIG. 1 illustrates an example environment for implementing indoor geolocation and access control, in accordance with some aspects of the present disclosure.

FIG. 1 is a diagram showing an example of an access control system 100, in accordance with some aspects of the present disclosure. As illustrated in FIG. 1, the access control system 100 may include a first access control device 102 (e.g., a reader device) configured to control access to a first secure area/asset (SAA) 104 (e.g., a locked door), and a second access control device 106 (e.g., a reader device) configured to control access to a second SAA 108 (e.g., a locked door). As described herein, the first access control device 102 and the second access control device 106 may be co-located. Some examples of a SAA may include entrances, exits, buildings, plants, warehouses, laboratories, safe-deposit boxes, computer devices, files, software, databases, information, other digital data, etc. Although FIG. 1 illustrates two access control devices configured to manage access to two co-located secure SAAs, respectively, the access control system 100 may include more than two access control devices each managing a corresponding SAA.

Further, an authorized user 110 may possess a mobile device 112 configured to unlock an access control device (e.g., the access control device 102 or the access control device 106). In some implementations, a speaker 114 of the mobile device 112 may be configured to acoustically broadcast authentication messages (AM) 116 to the access control devices 102 and 106. In addition, in some aspects, the authentication messages 116 may cause an access control device (e.g., access control devices 102 and 106) to provide access to SAA (e.g., secure SAAs 104 and 108). In some aspects, "co-located" may refer to having a distance between two access control devices that a mobile device can perform an authentication process using the authentication messages with both access control devices contemporaneously.

In an example, the authorized user 110 may endeavor to access the first SAA 104 via the first access control device 102. As described herein, the first SAA 104 may be configured to prevent the co-located second access control device 106 from providing access (e.g., unlocking) to the second SAA 108 when the authorized user 110 attempts to access the first SAA 104 via the first access control device 102. As illustrated in FIG. 1, the first access control device 102 may include an access management module 118 configured to determine the access control device of interest to the authorized user 110 (i.e., the access control device corresponding to the SAA that the authorized user 110 is attempting to access).

The first access control device 102 may collect first environmental information 120 and the second access control device 106 may collect second environmental information 122. In some aspects, the environmental information 120 may include audio information captured at an access control device, infra-red sensor readings received at an access control device, and exit sensor readings received at a door of the secured asset/area. Further, the first access control device 102 may determine first input information 124 based on the first environmental information 120, and the second access control device 106 may determine second input information 126 based on the second environmental information 122. In some other examples, the second access control device 106 may transmit the second environmental information 122 to the first access control device 102, and the first access control device may determine the second input information 126 from the second environmental information 122. In some aspects, the input information may include power information (e.g., Ultrasonic RMS power levels), foot information (e.g., footstep detection/direction), infrared (IR) information, or exit information. Additionally, the access management module 118 may employ a machine learning (ML) model to determine which of the co-located SAAs the authorized user 110 is trying to access based at least in part on the first input information 124 and the second input information 126. In some aspects, the ML model may be a convolutional neural network. Once the access management module 118 identifies the SAA that the authorized user 110 is trying to access, the access management module 118 may cause the corresponding access control device to open the identified SAAs for the authorized user 110.

Figure 2:
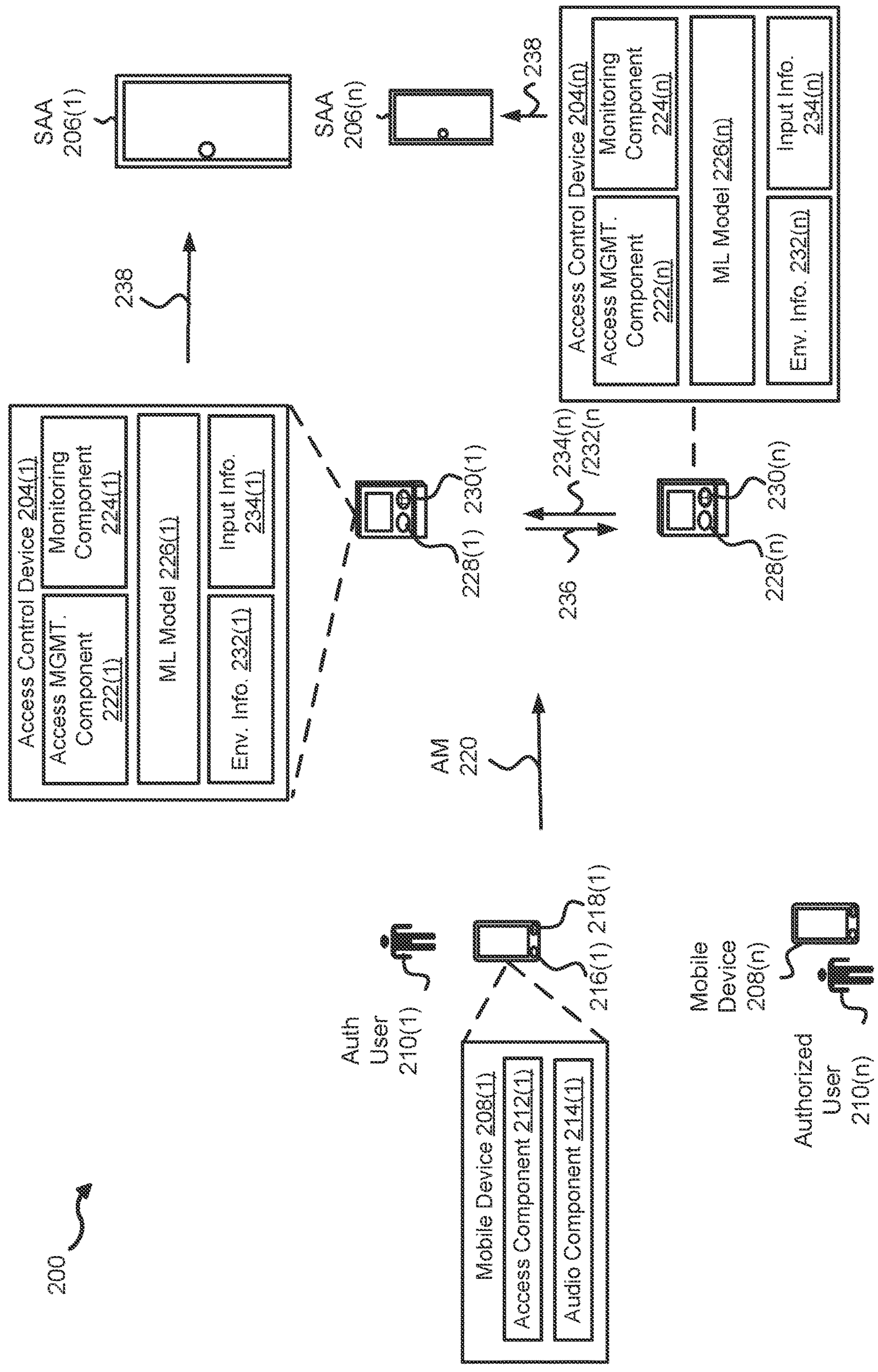
FIG. 2 illustrates an example architecture of a system implementing indoor geolocation and access control, in accordance with some aspects of the present disclosure.

FIG. 2 is a diagram showing an example of an access control system 200, in accordance with some aspects of the present disclosure. As illustrated in FIG. 2, the access control system 200 deployed within a controlled environment 202 may include a plurality of co-located access control devices 204(1)-(n), a plurality of SAAs 206(1)-(n), one or more mobile devices 208(1)-(n), and one or more authorized users 210(1)-(n). Each access control device 204 may manage access to a corresponding SAA 206. For example, the first secure access control device 204(1) may manage access to the first SAA 206(1), the nth secure access control device **204(*n*) may manage access to the nth SAA 206(*n*), and so forth. Further, each authorized user 210 may possess a mobile device 208. For example, the first authorized user 210(1) may possess the first mobile device 208(1), the nth authorized user 210(*n*) may possess the nth mobile device 208(*n*)**, and so forth.

As illustrated in FIG. 2, the mobile device 208 may include an access component 212, an audio component 214, a speaker 216 configured to acoustically transmit audio signals, and a microphone 218 configured to acoustically receive audio signals. Further, in some aspects, the authorized user 210(1) may employ the mobile device 208(1) to gain access to the secure SAAs 206(1)-(*n*). The access component 212 may be configured to perform one or more authentication techniques with the access control devices 204(1)-(*n*). For example, the access component 212 may be configured to generate an authentication message 220 and broadcast the authentication message 220 to the access control devices 204(1)-(*n*) via the speaker 216. Further, an authentication message 220 may include a user identifier of an authorized user 210, a password or credential associated with the authorized user 210, and identifiers of one or more SAAs 206 the authorized user 210 is permitted to access. In some examples, the access component 212 may be a mobile application installed on the mobile device 208(1)

In some aspects, the authentication message 220 may be an ultrasonic signal or other form of acoustic signal. For instance, the audio component 214 may be configured to acoustically modulate authentication and/or authorization information corresponding to the authorized user 210 into an acoustic signal by a mobile application. For example, the authentication message 220 may be a 256-bit binary sequence, such as 10-11-02- . . . 1255. The subscripts indicate the bit position in the binary sequence. The audio component 214 may modulate the 256-bit binary sequence (e.g., 10-11-02- . . . 1255) into a frequency modulated sequence of [frequency0-frequency1-frequency2- . . . frequency255], where each frequency-n may be a high frequency (representing a binary "1") or a low frequency (representing a binary "0"). In other words, the frequency modulated sequence is HF0-HF1-LF2- . . . HF255. In addition, or alternatively, in some aspects, amplitude modulation or other types of acoustic modulations may be used.

As illustrated in FIG. 2, an access control device 204 may include an access management component 222, a monitoring component 224, a ML model 226, a speaker 228, and a microphone 230. As described in detail herein, the access control device 204 may manage authentication of an authorized user and unlocking of the corresponding SAA 206. Further, the access management component 222 may be configured to determine whether to provide access to the corresponding SAA 206 based on the authentication message 220, and the output of the monitoring component 224 and the ML model 226.

In particular, the monitoring component 224 may be configured to collect environmental information 232. In some examples, the monitoring component 224 may include one or more sensors for collecting the environmental information 232. Additionally, or alternatively, the monitoring component 224 may receive the environmental information 232 from one or more input/output devices of the access control device 204.

In some aspects, the environmental information 232 may include audio information captured by the speaker and provided to the monitoring component 224. Further, the audio information may be sampled at 48 KHz, e.g., 16-bit signed samples are grouped into 50-millisecond frames to generate 2400 samples per frame. Additionally, the audio information may be windowed using a hamming windowed and processed using a fast Fourier transformation (FFT) to generate a spectral representation of the audio information as a frame. In some aspects, the audio information may be windowed using a 5 millisecond hamming window to generate a spectral representation having 2400 samples per frame. In addition, in some aspects, the environmental information 232 may include infra-red sensor (IR) readings sampled at 48 KHz to generate 1 bit signals to compose a 2400 sample frame. In some aspects, the IR sensor readings may be captured by an IR sensor of the monitoring component 224. Further, the environmental information 232 includes exit sensor readings associated with a request to exit (RTE) signal capture by a RTE sensor of the monitoring component 224. In some aspects, the exit sensor readings may be sampled at 48 KHz to generate 1 bit signals to compose a 2400 sample frame.

Further, the access management component 222 may be configured to generate input information 234 (e.g., power information, foot information, IR information, exit information) for the ML model 226 based on the environmental information 232. For example, the access management component 222 may derive power information based on the audio information. In some aspects, the power information includes ultrasonic root mean square (RMS) power levels. Further, the power information may be determined by processing the audio information, filtering out bands of interest (e.g., the ultrasonic bands of interest), generate frames from the filter audio information, and calculating relative power with respect to ground noise. In some examples, the access management component 222 may derive foot information based on the audio information. The foot information may indicate the detection of footsteps and/or the direction of the footsteps. Further, the foot information may be determined by processing the audio information, downsampling the audio information, filtering out the audible audio, and performing autocorrelation or another processing technique on the filtered audio information to detect footsteps and/or the direction of the footsteps. In some examples, IR information may indicate whether an IR signal has been received at the access control device 204 based on the IR sensor readings. In some aspects, the IR information may be Boolean values (or any other binary type corresponding to true or false) determined by removing redundancy from IR sensor readings performed at the access control device 204. In some examples, exit information may indicate whether a RTE signal has been received at the access control device 204 based on an exit sensor reading. In some aspects, the exit information may include Boolean values (or any other binary type corresponding to true or false) determined by removing redundancy from RTE sensor readings performed at the access control device 204.

The ML model 226 may be configured to perform one or more machine learning and/or pattern recognition techniques to determine a SAA of interest to an authorized user 210 based on the input information 234. In some examples, the ML model 226 may include a neural network or another type of machine learning model. In some aspects, a "neural network" may refer to a mathematical structure taking an object as input and producing another object as output through a set of linear and non-linear operations called layers. Such structures may have parameters which may be tuned through a learning phase to produce a particular output. Some examples of neural networks can include deep learning networks, convolutional neural networks, feed-forward neural networks, recurrent neural networks (e.g., long short-term memory recurrent neural networks), or other forms of neural networks.

For example, in some aspects, the ML model 226 may be implemented as a convolutional neural network including convolutional layers that provide discovery and processing of signal cross-correlation. Further, the ML model 226 may also include down-sampling layers that lower the number of parameters of the model, thereby accelerating training and classification. Further, as illustrated in FIG. 2, the ML model 226(1) of the first access control device 204(1) may receive the input information 234(2)-(*n*) of the co-located access control devices 204(2)-(*n*), and determine the access intention information 236 indicating the SAA 206 that the authorized user 210(1) intends to access (e.g., the access intention information 236 may include the output of the ML Model 226(1) and the highest score may identify the access control device 204 of interest to the authorized user 210(1)). Further, if the access intention information 236 indicates that the authorized user 210(1) endeavors to access SAA 206(1), the access management component 222(1) may provide access to the SAA 206(1), e.g., unlock a security mechanism coupled to the SAA 206(1) via an access instruction 238. Otherwise, if the access intention information 236 indicates that the authorized user 210(1) endeavors to access one of the other co-located SAAs, e.g., SAA 206(*n*), the access management component 222(1) may transmit the access intention information 236 to the access control device 204(*n*) associated with the particular SAA 206(*n*). Further, upon receipt of the access intention information 236 by the access control device 204(*n*), the access management component 222(*n*) of the access control device 204(*n*) may provide access to the SAA 206(1), e.g., unlock a security mechanism coupled to the SAA 206(*n*).

Figure 3:
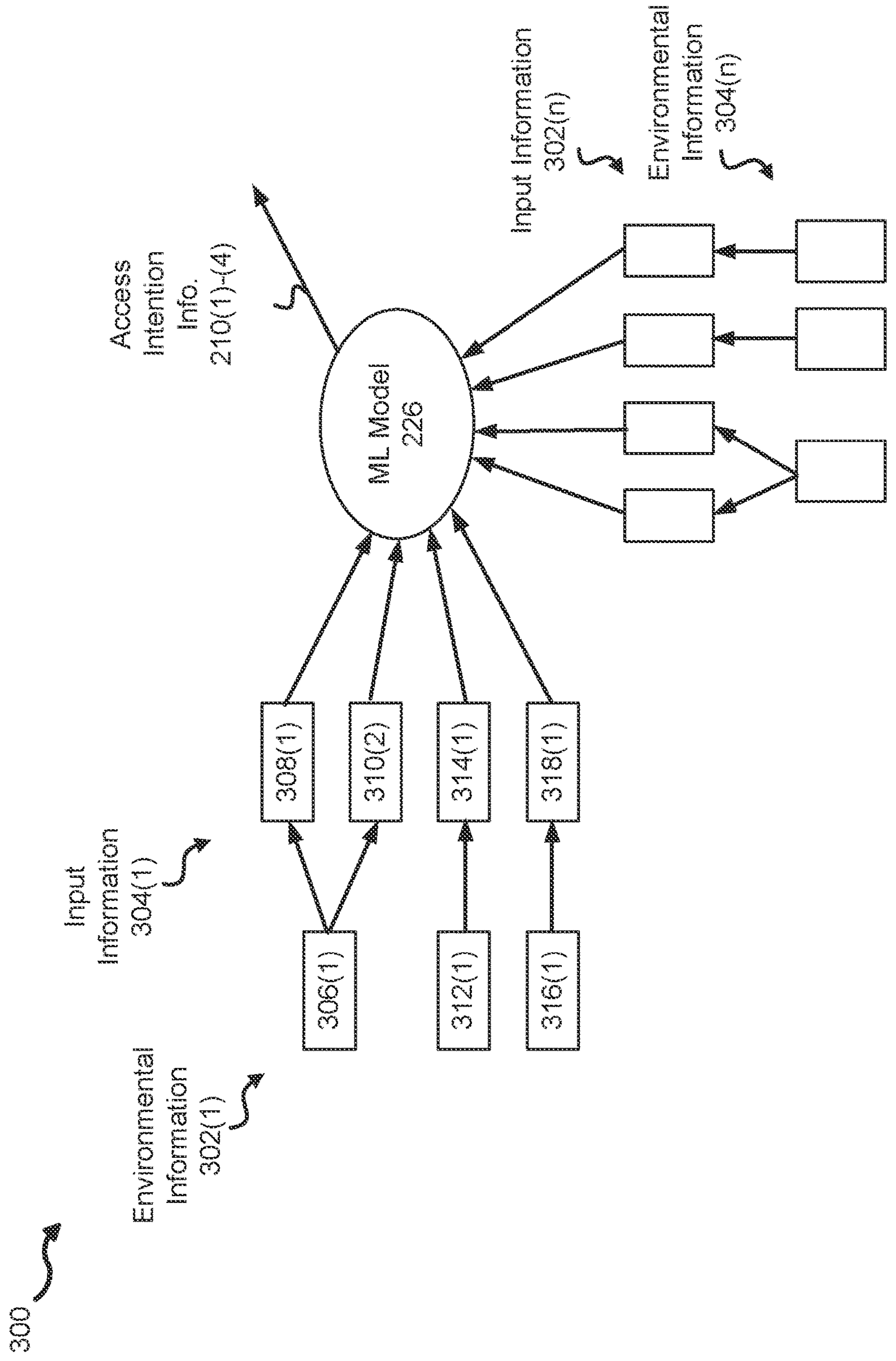
FIG. 3 is a diagram of an example pre-processing pipeline of a machine learning (ML) model, in accordance with some aspects of the present disclosure.

FIG. 3 is a diagram of an example pre-processing pipeline 300 for a ML model, in accordance with some aspects of the present disclosure. As illustrated in FIG. 3, the environmental information 302 may be converted into the input information 304 as described with respect to FIG. 2. For example, the audio information 306(1) may be used to generate the power information 308(1) and the foot information 310(1), the IR sensor readings 312(1) may be used to generate the IR information 314(1), and the exit sensor readings 316(1) may be used to generate the exit information 318(1). Further, the input information 304 (i.e., the power information 308(1), the foot information 310(1), the infrared information 314(1), and the exit information 318(1)) may be provided to the ML model 226 to determine the access intention information 236, as described in detail with respect to FIGS. 2 and 4.

Figure 4:
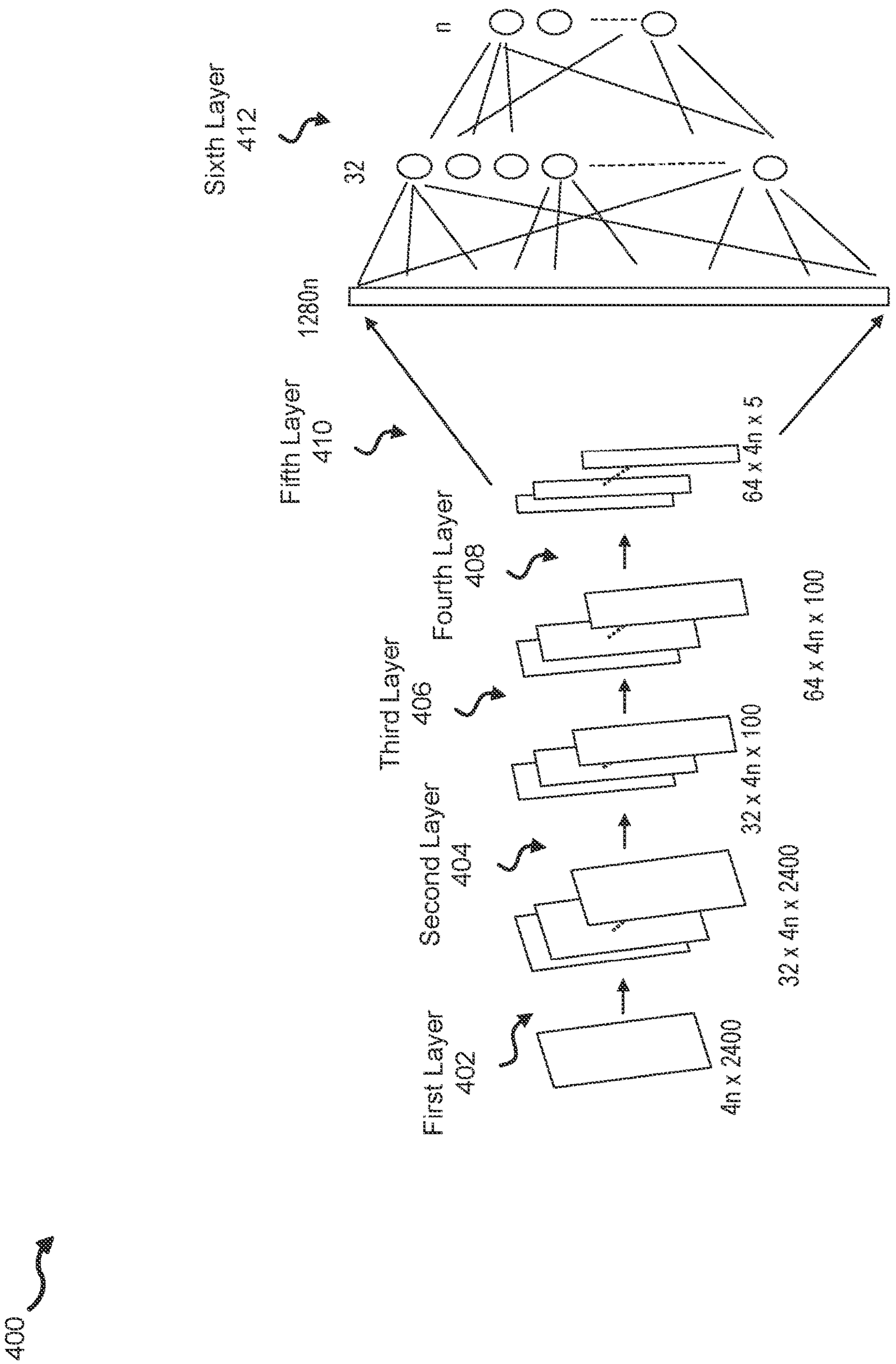
FIG. 4 is a diagram of an example convolutional neural network for implementing indoor geolocation and access control, in accordance with some aspects of the present disclosure.

FIG. 4 is a diagram of an example convolutional neural network (CNN) for implementing indoor geolocation and access control, in accordance with some aspects of the present disclosure. As illustrated in FIG. 4, a CNN 400 may include a plurality of layers 402-412. Once the model is trained, the output 1×n tensor specifies the probability that each of the n reader/SAA sets is the reader/SAA set of interest to an authorized user.

Every 50 milliseconds, the input to the CNN 400 is a (4n)×2400 tensor where n is the number of sets under analysis. At a first layer 402 of the CNN 400, the resulting 32×4n×2400 tensor is down sampled to 32×4n×100. Next, at a second layer 404, the 32×4n×100 tensor is applied to a 64-channel bidimensional convolution. Further, at a third layer 406, the resulting 64×4n×100 tensor is down sampled to 64×4n×5. At a fourth layer 408, the 64×4n×5 tensor is flattened. Additionally, at a fifth layer 410, the unidimensional 1280n tensor is fully connected to a 32-node layer. The output results from a n-node sixth layer 412 that may have a 10% dropout.

Figure 5:
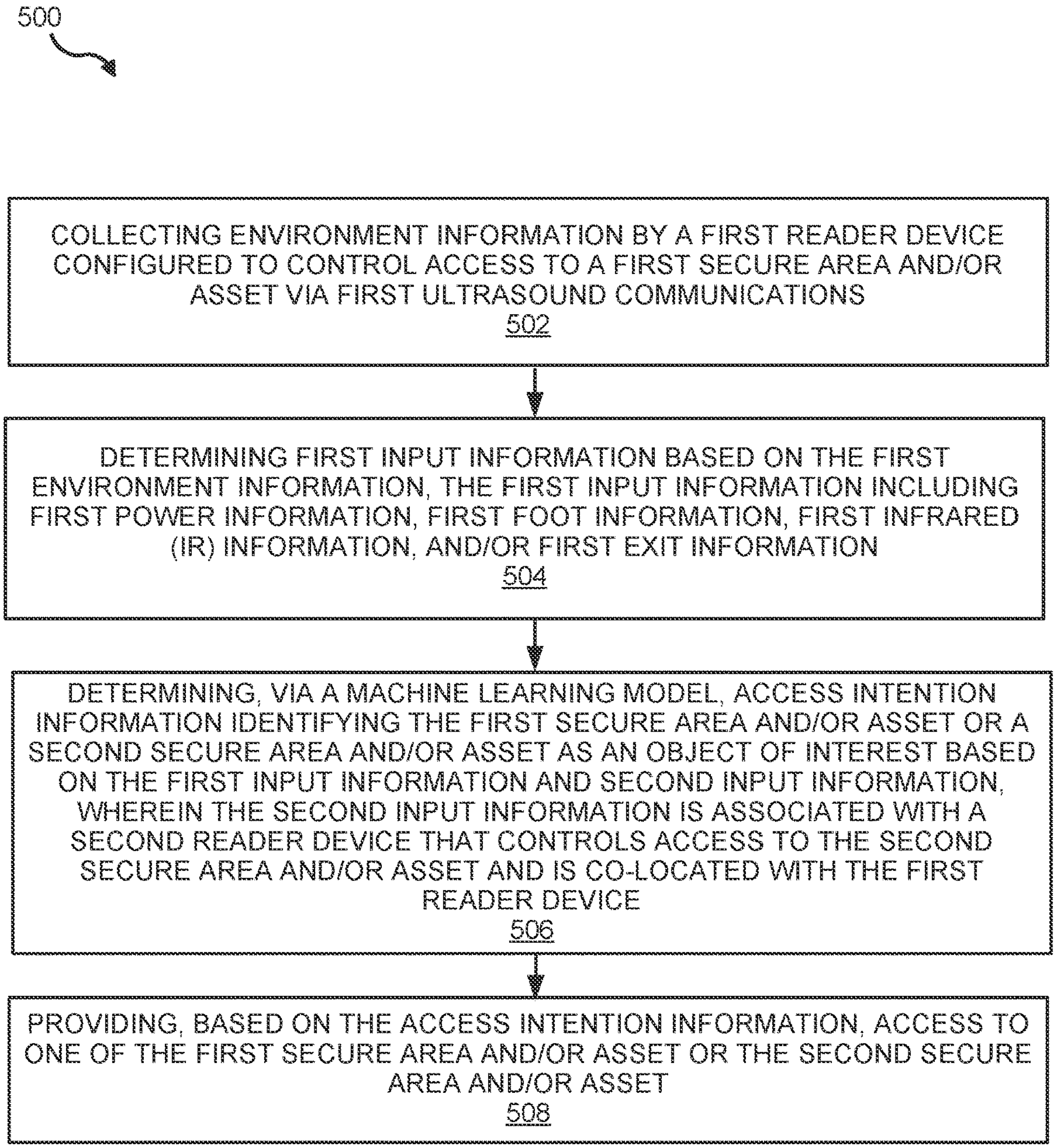
FIG. 5 is a flow diagram illustrating an aspect of an example method for implementing indoor geolocation and access control, in accordance with some aspects of the present disclosure.

FIG. 5 is a flow diagram illustrating an aspect of an example method for implementing indoor geolocation and access control, in accordance with some aspects of the present disclosure.

At block 502, the method 500 may include collecting environment information by a first reader device configured to control access to a first secure area via first ultrasound communications. For example, the monitoring component 224(1) of the access control device 204(1) (i.e., the first reader device) may collect the environmental information 232(1). Further, as described herein, as an example, the first environmental information 232(1) may include audio information 306(1) captured at an access control device 204(1), infra-red sensor readings 312(1) received at an access control device 204(1), and exit sensor readings 316(1) received at a door of the secure area/asset 206(1).

Accordingly, the access control device 102, the access control device 106, the access control device 204, the computing system 600, and/or the processor 604 executing the access management component 222 and/or the monitoring component 224 may provide means for collecting environment information by a first reader device configured to control access to a first secure area via first ultrasound communications.

At block 504, the method 500 may include determining first input information based on the environment information, the first input information including first power information, first foot information, first infrared (IR) information, and/or exit information. For example, the access management component 222(1) may determine the input information 234(1) from the environmental information 232(1). As described herein, in some aspects, the input information 234(1) may include the power information 310(1), the foot information 312(1), IR information 316, and the exit information 318(1).

Accordingly, the access control device 102, the access control device 106, the access control device 204, the computing system 600, and/or the processor 604 executing the access management component 222 may provide means for determining first input information based on the environment information, the first input information including first power information, first foot information, first infrared (IR) information, and/or exit information.

At block 506, the method 500 may include determining, via a machine learning model, access intention information identifying the first secure area or asset or the second secure area or asset based on the first input information and second input information, wherein the second input information is associated with a second reader device that controls access to the second secure area and/or asset and is co-located with the first reader device. For example, the access management component 222 may employ the ML model 226 to determine the access intention information 236 (i.e., the access intention information) identifying which of the access control device 204(1) and access control device 204(2) (i.e., the second reader device) the authorized user 210(1) is attempting to have provide access to a corresponding SAA 206 based on at least the input information 234(1) and the first input information 234(1). In some aspects, the access control device 204(1) may receive the second environmental information 232(2) from the co-located access control device 204(2), and generate the second input information 234(2) based on the second environmental information 232(2). Alternatively, in some other examples, the second access device 204(2) may collect the second environmental information 232(2), generate the second input information 234(2) based on the environmental information 232(2), and transmit the second input information 234(2) to the first access control device 204(1)

Accordingly, the access control device 102, the access control device 106, the access control device 204, the computing system 600, and/or the processor 604 executing the access management component 222 and/or the ML model 226 may provide means for determining, via a machine learning model, access intention information identifying the first secure area or the second secure area based on the first input information and second input information, wherein the second input information is associated with a second reader device that controls access to the second secure area and/or asset and is co-located with the first reader device.

At block 508, the method 500 may include providing, based on the access intention information, access to one of the first secure area or the second secure area. For example, the access intention information 236 may indicate that the first authorized user intends to access a first SAA 206 associated with the first access control device 204, and transmit an access instruction causing a lock coupled with the SAA to provide access to the first SAA when the user is authorized to so according to the authentication message 220.

Accordingly, the access control device 102, the access control device 106, the access control device 204, the computing system 600, and/or the processor 604 executing the access management component 222 may provide means for providing, based on the access intention information, access to one of the first secure area or the second secure area.

In an aspect, collecting the environment information comprises receiving an ultrasound authentication message generated by an application of a mobile device.

In an aspect, the environment information includes first audio information captured at the first reader device, first infra-red sensor readings captured at the first reader device, and first exit sensor readings captured at a door of the first secure area and/or asset.

In an aspect, determining the first input information based on the environment information comprises generating the power information from an ultrasonic root mean square level detected within audio information captured at the first reader device.

In an aspect, determining the first input information based on the environment information comprises generating the foot information from audio information captured at the first reader device, the foot information indicating a foot step direction.

In an aspect, the environment information includes a plurality of IR sensor readings captured at the first reader device and a plurality of exit sensor readings captured at the first reader device, and determining the first input information based on the environment information comprises deriving IR information based on the plurality of IR sensor readings at the first reader device, or deriving the exit information based on the plurality of exit sensor readings at the first reader device.

In an aspect, the machine learning model includes a convolutional neural network.

Figure 6:
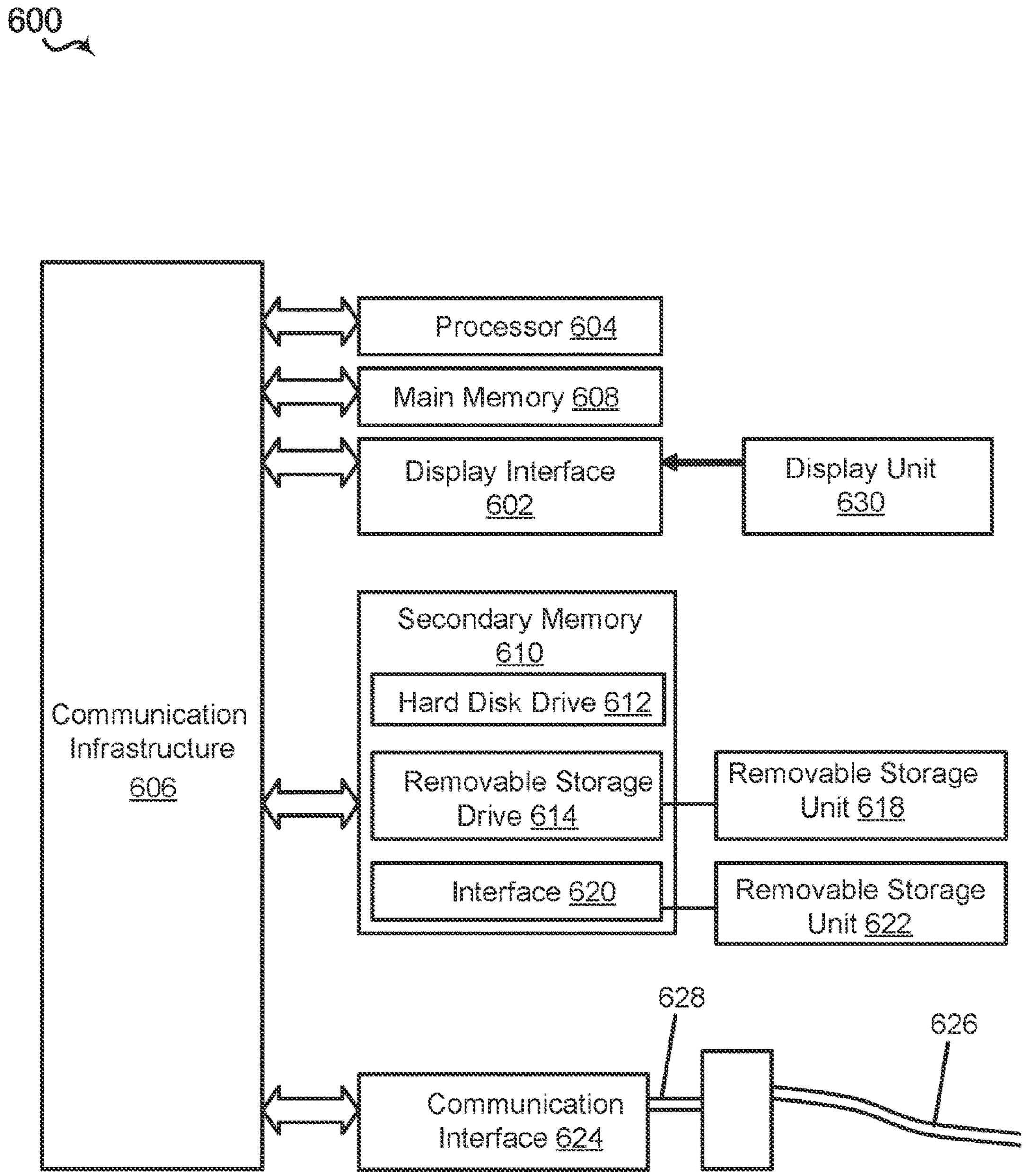
FIG. 6 is a block diagram illustrating an example of a hardware implementation for a computing device(s), in accordance with some aspects of the present disclosure.

Aspects of the present disclosures, such as the access control device 102 and/or the mobile device 112 may be implemented using hardware, software, or a combination thereof and may be implemented in one or more computer systems or other processing systems. In an aspect of the present disclosures, features are directed toward one or more computer systems capable of carrying out the functionality described herein. An example of such a computing system 600 is shown in FIG. 6. The access control device 102 and/or the mobile device 112 may include some or all of the components of the computing system 600.

The computing system 600 includes one or more processors, such as processor 604. The processor 604 is connected with a communication infrastructure 606 (e.g., a communications bus, cross-over bar, or network). The term "bus," as used herein, can refer to an interconnected architecture that is operably connected to transfer data between computer components within a singular or multiple systems. The bus can be a memory bus, a memory controller, a peripheral bus, an external bus, a crossbar switch, and/or a local bus, among others. Various software aspects are described in terms of this example computer system. After reading this description, it will become apparent to a person skilled in the relevant art(s) how to implement aspects of the disclosures using other computer systems and/or architectures.

The computing system 600 may include a display interface 602 that forwards graphics, text, and other data from the communication infrastructure 606 (or from a frame buffer not shown) for display on a display unit 630. Computing system 600 also includes a main memory 608, preferably random access memory (RAM), and may also include a secondary memory 610. The secondary memory 610 may include, for example, a hard disk drive 612, and/or a removable storage drive 614, representing a floppy disk drive, a magnetic tape drive, an optical disk drive, a universal serial bus (USB) flash drive, etc. The removable storage drive 614 reads from and/or writes to a removable storage unit 618 in a well-known manner. Removable storage unit 618 represents a floppy disk, magnetic tape, optical disk, USB flash drive etc., which is read by and written to removable storage drive 614. As will be appreciated, the removable storage unit 618 includes a computer usable storage medium having stored therein computer software and/or data. In some examples, one or more of the main memory 608, the secondary memory 610, the removable storage unit 618, and/or the removable storage unit 622 may be a non-transitory memory.

Alternative aspects of the present disclosures may include secondary memory 610 and may include other similar devices for allowing computer programs or other instructions to be loaded into computing system 600. Such devices may include, for example, a removable storage unit 622 and an interface 620. Examples of such may include a program cartridge and cartridge interface (such as that found in video game devices), a removable memory chip (such as an erasable programmable read only memory (EPROM), or programmable read only memory (PROM)) and associated socket, and other removable storage units 622 and interfaces 620, which allow software and data to be transferred from the removable storage unit 622 to computing system 600.

Computing system 600 may also include a communications interface 624. Communications interface 624 allows software and data to be transferred between computing system 600 and external devices. Examples of communications interface 624 may include a modem, a network interface (such as an Ethernet card), a communications port, a Personal Computer Memory Card International Association (PCMCIA) slot and card, etc. Software and data transferred via communications interface 624 are in the form of signals 628, which may be electronic, electromagnetic, optical or other signals capable of being received by communications interface 624. These signals 628 are provided to communications interface 624 via a communications path (e.g., channel) 626. This path 626 carries signals 628 and may be implemented using wire or cable, fiber optics, a telephone line, a cellular link, an RF link and/or other communications channels. In this document, the terms "computer program medium" and "computer usable medium" are used to refer generally to media such as a removable storage drive 618, a hard disk installed in hard disk drive 612, and signals 628. These computer program products provide software to the computing system 600. Aspects of the present disclosures are directed to such computer program products.

Computer programs (also referred to as computer control logic) are stored in main memory 608 and/or secondary memory 610. Computer programs may also be received via communications interface 624. Such computer programs, when executed, enable the computing system 600 to perform the features in accordance with aspects of the present disclosures, as discussed herein. In particular, the computer programs, when executed, enable the processor 604 to perform the features in accordance with aspects of the present disclosures. Accordingly, such computer programs represent controllers of the computing system 600.

In an aspect of the present disclosures where the method is implemented using software, the software may be stored in a computer program product and loaded into computing system 600 using removable storage drive 614, hard drive 612, or communications interface 620. The control logic (software), when executed by the processor 604, causes the processor 604 to perform the functions described herein. In another aspect of the present disclosures, the system is implemented primarily in hardware using, for example, hardware components, such as application specific integrated circuits (ASICs). Implementation of the hardware state machine so as to perform the functions described herein will be apparent to persons skilled in the relevant art(s).

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

The detailed description set forth above in connection with the appended drawings describes example embodiments and does not represent all the embodiments that may be implemented or that are within the scope of the claims. The term "exemplary," as used in this description, means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or "as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media may comprise RAM, ROM, electrically erasable programmable read only memory (EEPROM), compact disk (CD) ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

I claim:

1. A method of secure access comprising:

collecting environment information by a first reader device configured to control access to a first secure area via first ultrasound communications;

determining first input information based on the environment information, the first input information including exit information captured by a door sensor at a door of the first secure area wherein the exit information is determined based on whether a request to exit has been received by the first reader device;

determining, via a machine learning model, access intention information identifying the first secure area or a second secure area as an object of interest based on the exit information included in the first input information and second input information, wherein the second input information is associated with a second reader device that controls access to the second secure area and is co-located with the first reader device; and providing, based on the access intention information, access to one of the first secure area or the second secure area.

2. The method of claim 1, wherein collecting the environment information comprises receiving an ultrasound authentication message generated by an application of a mobile device.

3. The method of claim 1, wherein the environment information includes first audio information captured at the first reader device and first infra-red sensor readings captured at the first reader device.

4. The method of claim 1, wherein determining the first input information based on the environment information comprises generating power information from an ultrasonic root mean square level detected within audio information captured at the first reader device.

5. The method of claim 1, wherein determining the first input information based on the environment information comprises generating foot information from audio information captured at the first reader device, the foot information indicating a foot step direction.

6. The method of claim 1, wherein the environment information includes a plurality of IR sensor readings captured at the first reader device and a plurality of exit sensor readings captured at the first reader device, and determining the first input information based on the environment information comprises:

deriving IR information based on the plurality of IR sensor readings at the first reader device, or deriving the exit information based on the plurality of exit sensor readings at the first reader device.

7. A non-transitory computer-readable device having instructions thereon that, when executed by at least one computing device, cause the at least one computing device to perform operations comprising:

collecting environment information by a first reader device configured to control access to a first secure area via first ultrasound communications;

determining first input information based on the environment information, the first input information including exit information captured by a door sensor at a door of the first secure area wherein the exit information is determined based on whether a request to exit has been received by the first reader device;

determining, via a machine learning model, access intention information identifying the first secure area or a second secure area as an object of interest based on the exit information included in the first input information and second input information, wherein the second input information is associated with a second reader device that controls access to the second secure area and is co-located with the first reader device; and providing, based on the access intention information, access to one of the first secure area or the second secure area.

8. The non-transitory computer-readable device of claim 7, wherein the environment information includes first audio information captured at the first reader device and first infra-red sensor readings captured at the first reader device.

9. The non-transitory computer-readable device of claim 7, wherein collecting the environment information comprises receiving an ultrasound access request message generated by an application of a mobile device.

10. The non-transitory computer-readable device of claim 7, wherein determining the first input information based on the environment information comprises generating power information from an ultrasonic root mean square level detected within audio information captured at the first reader device.

11. The non-transitory computer-readable device of claim 7, wherein determining the first input information based on the environment information comprises generating foot information from audio information captured at the first reader device, the foot information indicating a foot step direction.

12. The non-transitory computer-readable device of claim 7, wherein the environment information includes a plurality of IR sensor readings captured at the first reader device and a plurality of exit sensor readings captured at the first reader device, and determining the first input information based on the environment information comprises:

deriving the IR information based on the plurality of IR sensor readings at the first reader device, or deriving the exit information based on the plurality of exit sensor readings at the first reader device.

13. A system comprising:

a memory storing instructions thereon; and at least one processor coupled with the memory and configured by the instructions to:

collect environment information by a first reader device configured to control access to a first secure area via first ultrasound communications;

determine first input information based on the environment information, the first input information including exit information captured by a door sensor at a door of the first secure area wherein the exit information is determined based on whether a request to exit has been received by the first reader device;

determine, via a machine learning model, access intention information identifying the first secure area or a second secure area as an object of interest based on the first input information and second input information, wherein the second input information is associated with a second reader device that controls access to the second secure area and is co-located with the first reader device; and provide, based on the access intention information, access to one of the first secure area or the second secure area.

14. The system of claim 13, wherein the environment information includes first audio information captured at the first reader device and first infra-red sensor readings captured at the first reader device.

15. The system of claim 13, wherein to determine the first input information based on the environment information, the at least one processor is further configured by the instructions to generate power information from an ultrasonic root mean square level detected within audio information captured at the first reader device.

16. The system of claim 13, wherein to determine the first input information based on the environment information, the at least one processor is further configured by the instructions to generate foot information from audio information captured at the first reader device, the foot information indicating a foot step direction.

17. The system of claim 13, wherein the environment information includes a plurality of IR sensor readings captured at the first reader device, a plurality of exit sensor readings captured at the first reader device, and to determine the first input information based on the environment information, the at least one processor is further configured by the instructions to:

derive the IR information based on the plurality of IR sensor readings at the first reader device, or derive the exit information based on the plurality of exit sensor readings at the first reader device.

18. The non-transitory computer-readable device of claim 7, wherein the exit information comprises binary exit sensor readings.

* * * * *